June 12, 1934.  J. B. NELSON ET AL  1,962,570
FISH HOLDING DEVICE
Filed May 20, 1932   2 Sheets-Sheet 1
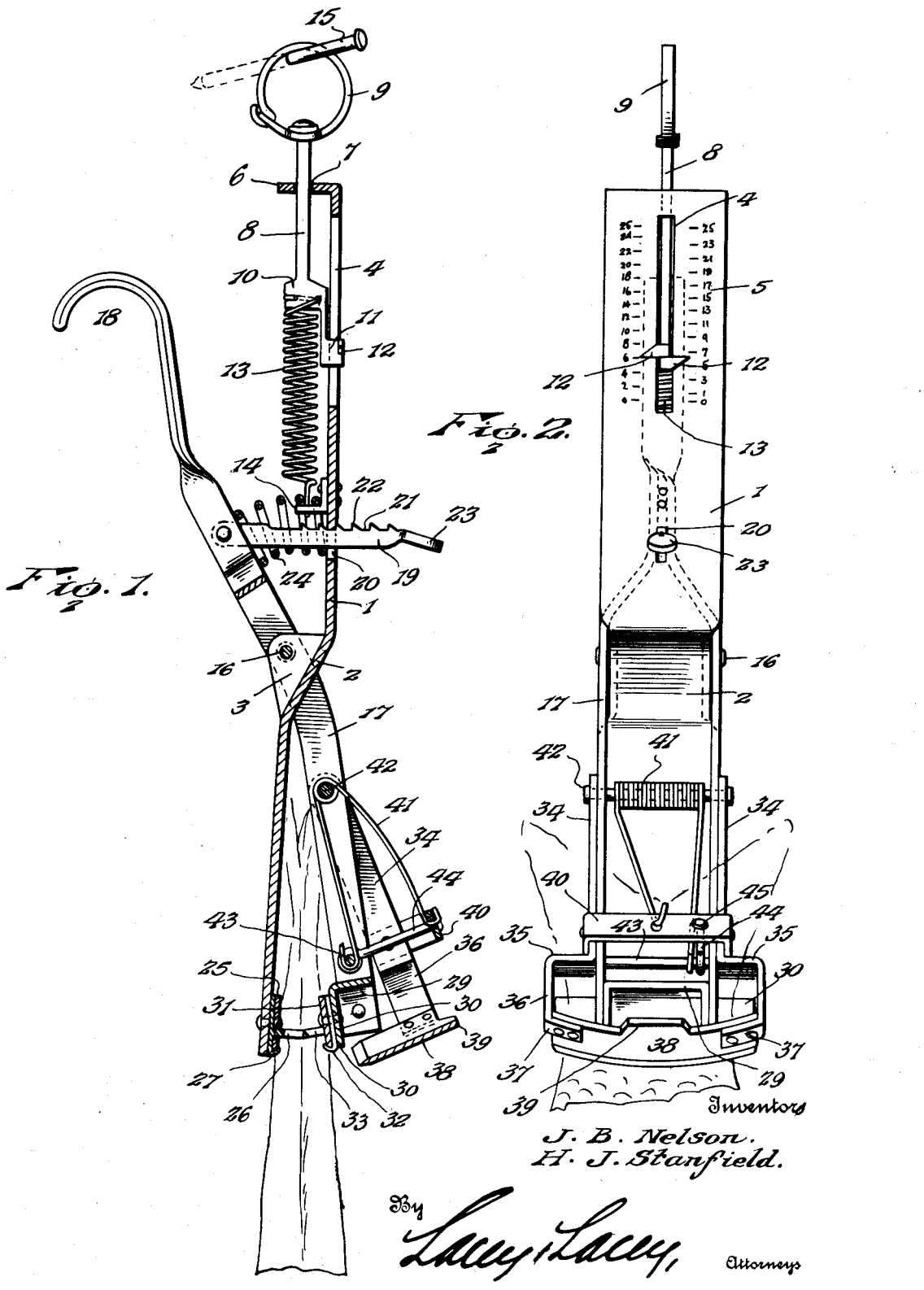
Inventors
J. B. Nelson.
H. J. Stanfield.
By Lacey & Lacey, Attorneys

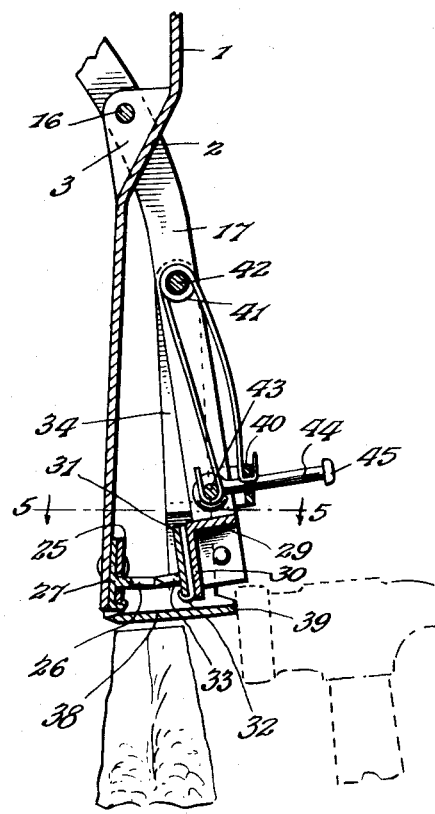
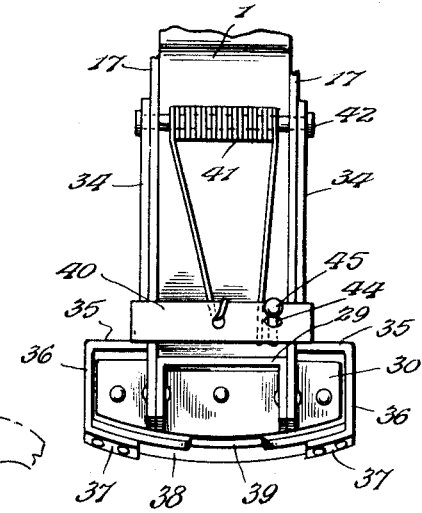
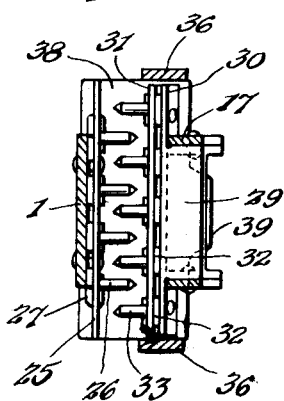
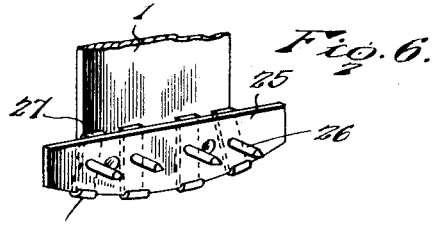
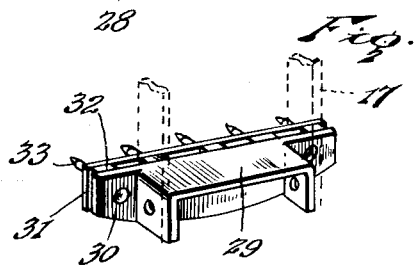

Patented June 12, 1934

1,962,570

UNITED STATES PATENT OFFICE 1,962,570

FISH-HOLDING DEVICE

John B. Nelson, Manly, and Harry J. Stanfield, Mason City, Iowa

Application May 20, 1932, Serial No. 612,600

7 Claims. (Cl. 17—8)

The object of this invention is to provide a device whereby fish may be firmly held during cleaning and scaling and avoid the necessity of being directly handled so that the more or less objectionable smell which is attendant upon the handling of fish will be overcome. The invention also provides means whereby after a fish has been cleaned and scaled the tail may be quickly and effectually severed from the rest of the body. The invention also provides means whereby the weight of the fish may be easily noted both before and after cleaning. The invention is illustrated in the accompanying drawings and consists in certain novel features which will be hereinafter first fully described and then more particularly defined.

In the drawings, Figure 1 is a longitudinal section of our fish holder showing the same in its operative position, Fig. 2 is a front elevation of the same, Fig. 3 is a longitudinal section of the holding portion of the tool illustrating the manner of removing the fish tail from the body, Fig. 4 is a front elevation of the structure shown in Fig. 3, Fig. 5 is a transverse section on the line 5—5 of Fig. 3, Fig. 6 is a detail perspective view of one of the holding jaws, Fig. 7 is a similar view of the cooperating jaw.

In carrying out the present invention, there is employed a base plate or body member 1 which may be constructed of any suitable material and is preferably of metal so as to attain strength and durability. This body member 1 is a plate of proper dimensions having an offset portion 2 intermediate its ends and provided on said offset portion, at its edges, with lugs 3 which will be presently more specifically mentioned. In the upper end portion of the body member 1 is a longitudinal slot 4 and upon the front face of the member at the sides of the slot and arranged parallel therewith are graduations 5 calibrated to denote pounds or other weight units. The upper extremity of the bar or member 1 is provided with a rearwardly projected flange 6 having an opening therethrough, as indicated at 7, and through said opening extends a rod or shank 8 having a ring or similar suspending device 9 swiveled upon its upper end. The lower end of this shank or stem 8 is enlarged, as shown at 10, and offset and formed with a spur 11 projecting through the slot 4 and carrying index fingers or pointers 12 which are adapted to ride over the graduations 5 and thereby indicate the weight of a fish suspended in the device. Secured at its upper end to the enlargement 10 is a coiled spring 13 which extends downwardly and has its lower end secured to a bracket 14 which is fixed upon the rear side of the bar 1, as clearly shown in Fig. 1. It will be readily appreciated that the elements just described constitute a spring scale whereby if the device be suspended upon a nail or other supporting device, as indicated at 15, and a fish be secured by the lower end of the device, the weight of the fish will draw the body member downwardly against the tension of the spring 13 so that the index fingers 12 will be caused to ride upwardly. It may be noted that the fingers 12 extend in opposite directions but have their meeting edges in common, or alined, so that the index fingers will register upon both scales, but there will be no difficulty in reading the weight. On the contrary, the weight may be easily read inasmuch as the alined edges of the index fingers will constitute the reading edge and by providing the scales at both sides and alternating the weight-announcing numerals, the exact weight may be easily ascertained.

A pivot pin or rod 16 is fitted through the lugs 3 and secures thereto a jaw-carrying member 17 which consists of a bar or the like folded together between its ends and formed into a hook 18 which may be utilized as a grip member when the jaws are to be engaged with a fish. The end portions of the bar or strap constituting the jaw-carrying member 17 are separated and disposed substantially parallel, as best shown in Fig. 2, and they terminate adjacent the lower end of the base member 1, as shown in Figs. 1 and 3. Above the arch formed by the lower end portions of the member 17, a latch 19 is pivoted thereto and this latch extends through an opening 20 provided therefor in the base member 1, as shown and as will be understood. The upper edge of the latch is formed into notches 21 and teeth or stops 22 and the free end of the latch is flattened, as shown at 23, to provide a convenient finger hold. An expansion spring 24 is disposed between the members 1 and 17 and is coiled around the latch 19 with one end fitting over the bracket 14, as clearly shown in Fig. 1. This spring tends to hold the members 1 and 17 apart so that the jaws will be in open position and inasmuch as it engages the lower edge of the latch 19 tends to hold the upper notched edge in engagement with the upper end wall of the slot 20 so that, when the gripping jaws have been engaged with a fish's body, the body will be firmly clamped. When the fish is to be released, a downward push upon the finger grip 23 will disengage the holding-teeth 22 from the member 1 and the spring 24 will at once expand so as to open the jaws.

At the lower end of the base member 1 there is secured thereto a transverse plate 25 which preferably projects at its ends beyond the side edges of the base member, as clearly shown in Figs. 5 and 6, and this plate 25 carries teeth 26 which are adapted to enter the fish's body when the fish is to be secured. The teeth 26 are preferably in the form of pointed pins and may be formed or secured to the plate 25, but, for convenience in manufacture and possible needed repairs, we prefer to employ separate pins or teeth having heads 27 in the form of expanded plates which may fit between the plate 25 and the end of the base member 1 and have their ends bent over the edges of the plate 25, as indicated at 28, the pins or teeth extending through openings provided therefor in the plate 25. By this arrangement, if any one tooth should be bent or otherwise damaged so that its efficiency would be impaired, the damaged tooth may be removed and a new tooth substituted therefor without requiring the provision of a complete set of new teeth. In the present drawings, the lower edge of the plate 25 is shown as formed on an arc and the teeth are formed on a straight line extending longitudinally of the plate, but the particular shape of the plate or of the teeth is not essential and may be varied to suit the ideas of a customer. Between the lower extremities of the side bars of the member 17 is secured a U-shaped bracket 29 which is formed integral with a jaw plate 30 which projects somewhat beyond the side bars of the member 17, as clearly shown in Fig. 7. This jaw plate 30 has secured to its inner face a mating plate 31 and between said plates 30 and 31 are received the heads 32 of teeth 33 which correspond to the teeth 26 and cooperate therewith in holding a fish. As best shown in Fig. 5, the teeth are so disposed that the teeth 26 alternate with the teeth 33 and, therefore, when they have been engaged with the body of a fish the body will be very firmly held. Normally, the spring 24 holds the jaws separated or in open position so that the tail of a fish may be very easily inserted between the jaws, as will be understood upon reference to Fig. 1. By then placing the hand against the upper portion of the body member 1 with the thumb and fingers grasping the hook-like terminal of the member 17, said hook-like terminal may be pressed toward the body member 1 so that the jaws will be caused to clamp the fish, as shown in Fig. 1, whereby it will be firmly held, the latch 19 automatically riding into proper engagement with the upper end wall of the slot 20. The ring or other suspending member 9 may then be engaged over a nail or hook 15 so that the fish will be suspended therefrom or the member 9 may be anchored upon a workbench or table in any convenient manner. Whether the fish be suspended or placed upon a table, it will be securely held so that it may be scaled and cleaned without requiring the operator to place his hands upon the fish, and the swiveled mounting of the ring, or the like, 9 permits the fish holder to be reversed so that both sides of the fish may be treated.

Pivotally mounted upon the lower side members of the member 17 are straps or brackets 34 which lie close to the side bars of the member 17 and near the lower ends thereof are offset laterally, as shown at 35, so that their extremities 36 will be disposed in laterally spaced relation to the ends of said side bars and may clear the ends of the jaws, as will be understood upon reference to Fig. 5. The extreme ends of the straps 34 are bent inwardly toward each other, as shown at 37, and rigidly secured to a blade 38 which has its cutting edge presented inwardly or toward the fish-holding jaws, the outer edge of this blade being provided centrally with a lug or head 39 which is adapted to receive a blow from a hammer or other tool, as indicated in Fig. 3, after the fish has been cleaned so that a sharp blow from the hammer or other tool will cause the blade to pass through the fish's body and sever the tail therefrom. Just above the offsets 35 a bridging member 40 is secured to and spans the straps 34 and this bridging member is engaged by one end of a torsion spring 41 which is coiled around the pivot 42 connecting the straps 34 to the sides of the member 17, the opposite end of the spring being engaged with and held by a rod or rivet 43 which passes through the side bars of the member 17 and serves to reinforce the same and prevent spreading thereof. A stop pin 44 is mounted upon this cross pin or rivet 43 and has its outer end passing through an opening provided therefor in the bridging member 40 and is equipped with a head 45 which limits the outward movement of the bridging member and thereby prevents the blade 38 being swung outwardly to such a position relative to the jaw-carrying member 17 that it cannot be easily operated to sever the tail from the fish.

After the fish has been scaled and cleaned, the blade 38 is driven through the end of the body so as to sever the tail therefrom and the body may then be shipped or otherwise disposed of. The latch is then released, whereupon the fish tail will drop from between the jaws and may be caught in any refuse receptacle placed below the same. It will be readily noted that we have provided an exceedingly simple, compact and easily operated device whereby a fish's body may be firmly held in convenient position for cleaning and scaling and the direct handling of the fish will be minimized.

Having thus described the invention, we claim:—

1. An implement for the purposes set forth comprising pivotally connected jaw-carrying members, yieldable means for holding said members normally separated, releasable means for holding the members in closed position, and a knife carried by one of said members and movable to operative position across the ends of the jaw-carrying members when the latter are closed.

2. An implement of the type described comprising pivotally connected members, cooperating jaws carried by the ends of said members, means for holding the jaws yieldably separated, releasable means for holding the jaws closed and a knife pivotally mounted on one of the jaws and normally supported in inoperative position at an angle thereto and movable to operative position across the ends of the jaws when the latter are closed.

3. An implement of the type described comprising members pivotally connected intermediate their ends, cooperating jaws carried by the members at one end, means disposed at the opposite side of the pivotal connection between the members to hold them normally separated, means for holding the members in closed position, a knife pivotally mounted on one of the members and movable to operative position across the ends of the jaws when the members are closed, and means at the opposite end of one member for suspending the implement, said means being adapted to permit rotation of the implement and a fish held therein.

4. An implement of the character described comprising pivotally connected members, jaws carried by the lower ends of the members to grip and hold a fish, a knife pivotally mounted upon one of the members and adapted to be driven across a fish below the fish-holding jaws, yieldable means normally holding the knife away from the jaws, and means to limit the outward movement of the knife.

5. An implement of the character described comprising pivotally connected members, gripping jaws carried by the lower ends of the members, straps pivotally mounted upon one of the members, a knife blade secured to and extending between the lower ends of said straps whereby it may be swung below the jaws across a body held in the jaws, a spring mounted upon one of the pivotally connected members and engaged with the knife-carrying elements whereby to yieldably hold the knife in its outer position, and a stop pin mounted upon said pivotally connected member and limiting the outward movement of the knife.

6. An implement of the character described comprising pivotally connected members, jaws carried by the lower ends of said members and normally held in open position, straps pivotally mounted on one of the members and having their lower ends offset laterally, a knife carried by the offset ends of the straps and provided with a striking head, a bridging member connecting the straps, and yieldable means normally holding the knife away from the jaws, said knife being movable to operative position across the ends of the jaws.

7. An implement of the character described comprising pivotally connected members, jaws carried by the lower ends of the members and normally held in open position, a plate secured to the inner face of one of the jaws, impaling pins extending upwardly from said plate spaced plates secured to the other jaw, one of which is provided with an integral substantially U-shaped bracket to which one of the pivoted members is rigidly secured, and impaling pins extending inwardly from said spaced plates and coacting with the first-mentioned pins.

JOHN B. NELSON. [L. S.]
HARRY J. STANFIELD. [L. S.]